May 14, 1946. H. C. HARBERS 2,400,199
MOTOR VEHICLE
Filed Dec. 6, 1943 4 Sheets-Sheet 3
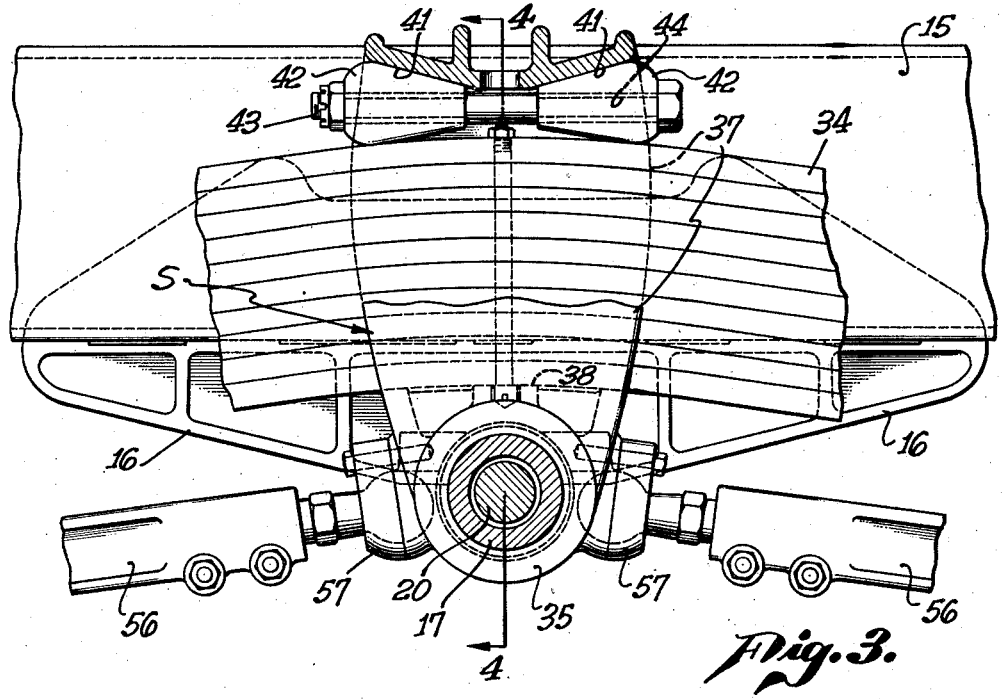
Fig. 3.
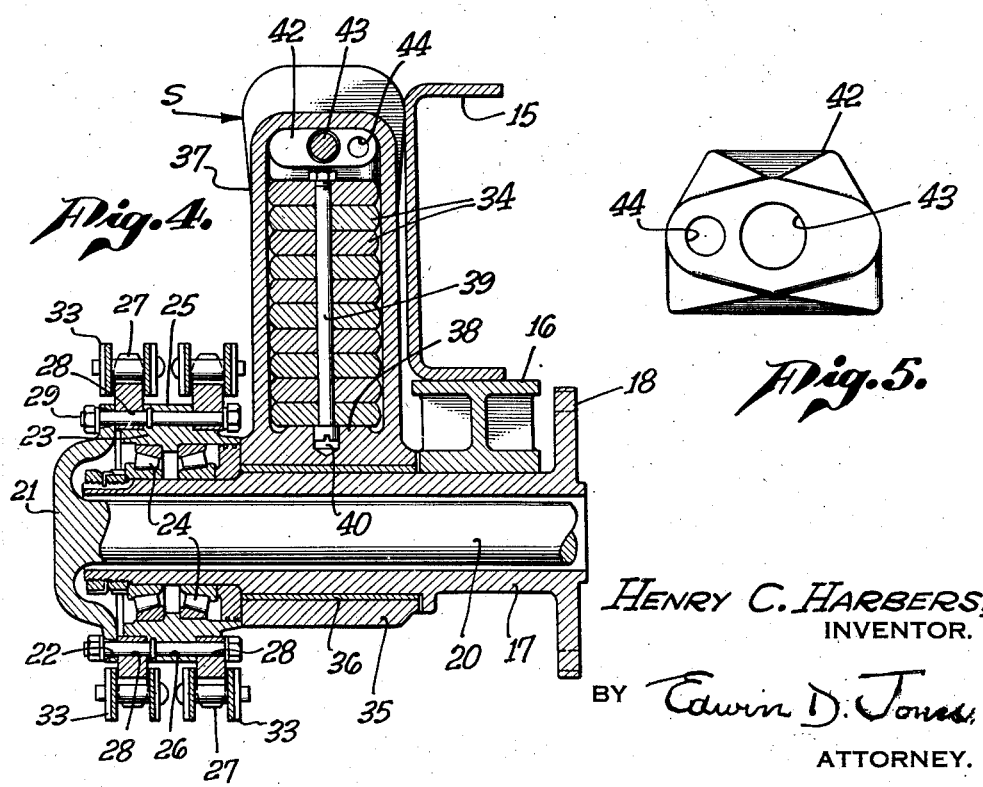
Fig. 4.
Fig. 5.
HENRY C. HARBERS,
INVENTOR.
BY Edwin D. Jones,
ATTORNEY.

May 14, 1946.     H. C. HARBERS     2,400,199
MOTOR VEHICLE
Filed Dec. 6, 1943     4 Sheets-Sheet 4

Henry C. Harbers,
INVENTOR.

BY Edwin D. Jones
ATTORNEY.

Patented May 14, 1946

2,400,199

UNITED STATES PATENT OFFICE 2,400,199

MOTOR VEHICLE

Henry C. Harbers, San Gabriel, Calif., assignor to C. B. Equipment Co., Los Angeles, Calif., a copartnership Application December 6, 1943, Serial No. 513,039

12 Claims. (Cl. 280—104.5)

My invention relates to motor vehicles, of the six wheel type, and it has for a purpose the provision of a four wheel bogie unit wherein the four wheels are chain driven, and in which a suspension means is incorporated characterized functionally by minimizing brake torque reaction so as to reduce bogie hopping.

I will describe only one form of motor vehicle bogie unit embodying my invention and will then point out the features thereof in claims.

In the accompanying drawings:

Fig. 3 is an enlarged fragmentary vertical sectional view taken on the line 3—3 of Fig. 1.

Fig. 4 is a vertical sectional view taken on the line 4—4 of Fig. 3.

Fig. 5 is an enlarged detail view showing in end elevation one of the wedge blocks.

Figure 1:
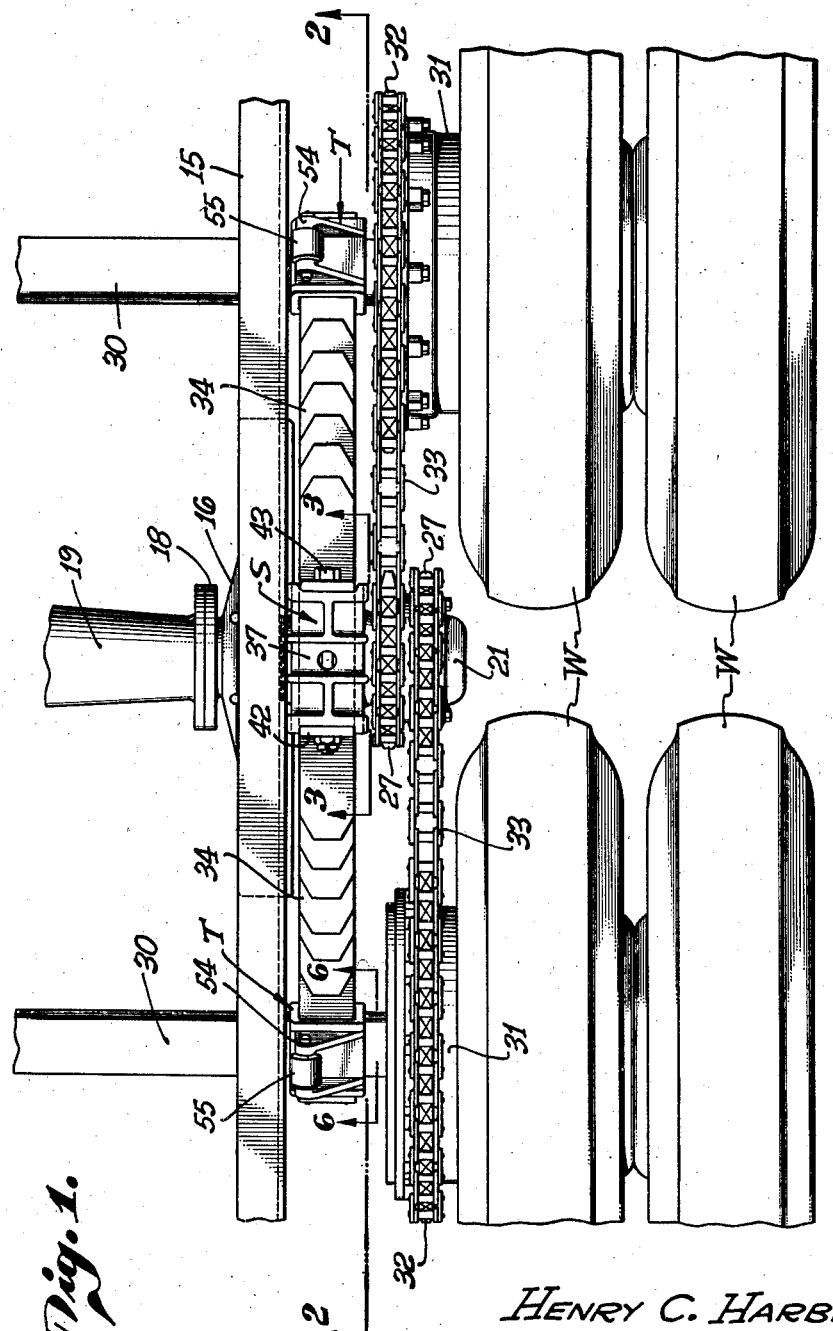
Fig. 1 is a view showing in fragmentary plan one form of motor vehicle embodying my invention.

Before proceeding to a more detailed description of this invention it should be stated that the bogie axles are mounted on the springs in such a way that the springs function to resist the torque forces developed in the bogie axles when the brakes are applied, and the radius rods are mounted in such a way that any slight rotation of the bogie axles due to the torque developed in them by the brakes will develop only a minimum amount of torque in the trunnion mounted on the driving axle housing, which would tend to rock it on its own axis out of its normal position and lift the rear ends of the springs, which, of course, would cause "hopping" of the rear wheels. In accordance with my invention I substantially eliminate the transmission of any appreciable torque force to the trunnion, and thus minimize bogie hopping.

Similar reference characters refer to similar parts in each of the several views.

Referring specifically to the drawings, my invention in its present embodiment comprises a vehicle frame made up in part of two side members 15 in channel iron form only one of which is illustrated. Likewise, only those parts constituting one half of the bogie unit have been illustrated to simplify the drawings, it being understood that the other half of the unit is a duplication in every detail.

Secured to the frame member 15 is a bracket 16 in which is held a tubular trunnion or spindle 17 having its inner end formed with a flange 18 which is bolted to the confronting end of a differential housing 19. A jack-shaft axle 20 extends through the trunnion 17 and the housing 19 where it is connected to the differential mechanism contained in the housing.

The outer end of the axle 20 projects from the trunnion 17 and is formed with a flange 21 having its marginal edge provided with a circle of bolt holes 22. A hub 23 which is journalled on the sleeve 17 by bearings 24, is formed with a wide annular rib 25 formed transversely with a circle of bolt holes 26. On opposite sides of this rib 25 are arranged a pair of driving sprockets 27 of ring form, and each sprocket is also formed with a circle of bolt holes 28.

With the parts just described assembled as best shown in Fig. 4, it will be clear that the holes of the flange 21, the rib 25, and the sprockets 27 register one with the other, to provide a common bolt hole circle so that bolts 29 can be extended therethrough to secure these elements to each other and thus provide a driving connection between the axle 20 and the sprockets 27.

The foregoing construction provides a large flange bolt circle to give added strength, while, on the other hand, the bolt circle for the sprockets is relatively small enabling a decrease in the number of sprocket teeth and thereby obtaining a low gear ratio when desired.

The bogie unit includes four drive wheels W, two on each side of the vehicle frame, which are carried upon two axles 30 positioned on opposite sides of the trunnion 17. The wheels are provided with suitable brakes 31 operated in any desirable manner, and associated with the wheels are driven sprockets 32 connected to the driving sprockets 27 by chains 33.

The frame of the vehicle is supported upon the axles 30 by a multiple leaf spring 34 the medial portion of which is secured in a saddle S, while its ends engage within stirrups T secured to the axles 30.

The saddle S is of such construction as to be susceptible of application to any multiple leaf spring for any suspension means for the wheels of a vehicle, and is characterized by its effectiveness to secure the spring against longitudinal shifting in the saddle. Also, as compared to previously designed saddles it is of greater strength and of less width to reduce the overall width of the vehicle as a whole.

As designed for the present bogie unit the saddle S comprises a sleeve or hub 35 rotatably mounted on the trunnion 17 with an interposed bushing 36. Cast integral with and rising from the sleeve 35 is an inverted U shape strap 37. On the upper side of the sleeve 35 is a projection 38 which forms a seat for the lowermost main leaf of the spring 34, such spring having a plurality of main leaves as illustrated. All leaves of the spring are secured together by a bolt 39 the head of which is received in a pocket 40 in the projection 38, when the spring is extended through the saddle.

The upper end of the strap 37 has its lower side of synclinal form to provide two surfaces 41 which are inclined downwardly toward each other. Two wedge blocks 42 are insertable into the saddle from opposite sides thereof to coact with the surfaces 41 in locking the spring in the strap. A single bolt 43 extends axially through both blocks 42 for drawing the blocks toward each other to effect the aforesaid locking of the spring, and in such manner as to relieve the center bolt 39 of all strain. Disalined openings 44 are formed in the blocks 42 into either of which any suitable tool may be extended and struck to force the other block from the saddle and allow removal of the spring from the saddle when required.

Figure 6:
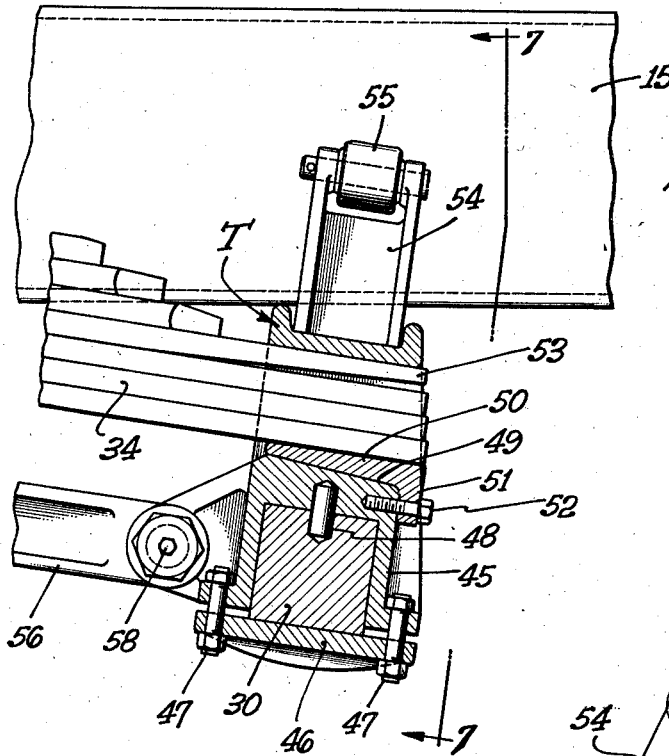
Fig. 6 is an enlarged fragmentary vertical sectional view taken on the line 6—6 of Fig. 1.
Figure 7:
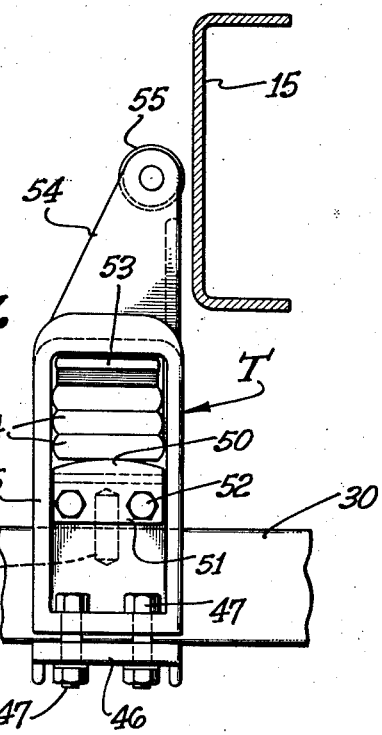
Fig. 7 is a vertical sectional view taken on the line 7—7 of Fig. 6.
Figure 8:
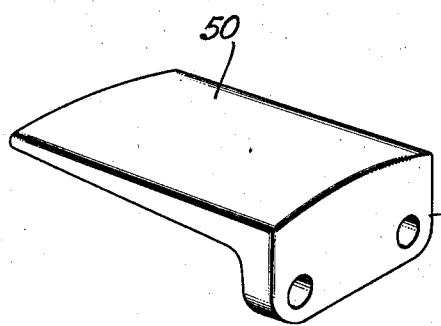
Fig. 8 is an enlarged perspective view of the wedge plate shown in Fig. 6.

As best shown in Figs. 6 and 7, the stirrup T for either spring end is in the form of a sleeve (see Figure 6) the upper side of which is in substantial engagement with the upper side of the spring, and has at its lower end a clamp for securing the stirrup to the respective axle 30, and as the axle is square in cross section the clamp has an upper portion 45 integral with the stirrup and of inverted U form to receive the axle, and a lower portion 46 in the form of a pressure plate adjustably secured to the upper portion by bolts 47. A dowel pin 48 connects the clamp portion 45 with the top side of the axle 30 to provide an additional receiving means.

The stirrup T is constructed so that it forms a socket for the end of the spring capable of imparting torque in the axle 30 to the spring; that is to say, it engages the spring at two places spaced from each other along the length of the spring. By reason of this any torque force developed in either jack-shaft results in a force couple imparted by the sleeve to the spring as explained hereinafter, which force couple is resisted by the spring, which absorbs this force. A slight flexing of the spring of course occurs when this force couple is resisted.

The stirrup T itself is of rectangular form to receive the ends of all of the main leaves of the spring, with the top of the clamp forming the bottom end of the stirrup. This bottom stirrup end is formed with an inclined surface 49 upon which seats a wedge plate 50 having a depending flange 51 which is secured to the stirrup by bolts 52.

To prevent excessive play and movement of the spring in the stirrup, and to automatically take up wear, the end of the uppermost main leaf of the spring is installed under tension. This may be effected by bending the leaf end upwardly as indicated at 53 so that when installed it will be flexed by its engagement with the top of the stirrup and thus placed under tension to produce a snug fit of the spring in the stirrup. The resiliency of the bent leaf end may be increased by tapering the leaf end as illustrated.

To facilitate assembly of the spring and stirrup, the wedge 50 has been provided. With the wedge removed the spring freely enters the stirrup, but upon insertion of the wedge the spring leaf end 53 is placed under the desired tension. The wedge also provides a replaceable part at the point of greatest wear of the stirrup. To restrain each axle 30 against axial movement transversely of the vehicle frame, the two stirrups T for that axle are each provided with abutments, and each abutment may comprise a bracket 54 formed integral with and rising vertically from the stirrup, and having a roller 55 journalled in its upper bifurcated end for engagement with the adjacent side of the frame member 15.

Connecting the two axles, to prevent shifting thereof longitudinally of the vehicle frame, are a pair of radius rods 56 connected to the hub 35 by ball and socket joints 57, and to the stirrups T by horizontal pivots 58. These radius rods combine with the springs 34 to form a suspension means for the bogie unit which in the present instance, I call a parallelogram arrangement of elements because the radius rods happen to be about parallel to the direction in which the lowest leaf of the spring extends. The assembly functions upon a brake application to minimize if not to actually eliminate transmission of torque to the stirrups supporting the springs and thereby greatly reduce hopping of the bogie unit. This general arrangement of the suspension assembly is particularly advantagous in its application to bogie units where the four wheels thereof are driven by chains, because it permits, without structural complexity, the required chain adjustments to maintain the chain drive operative.

Figure 2:
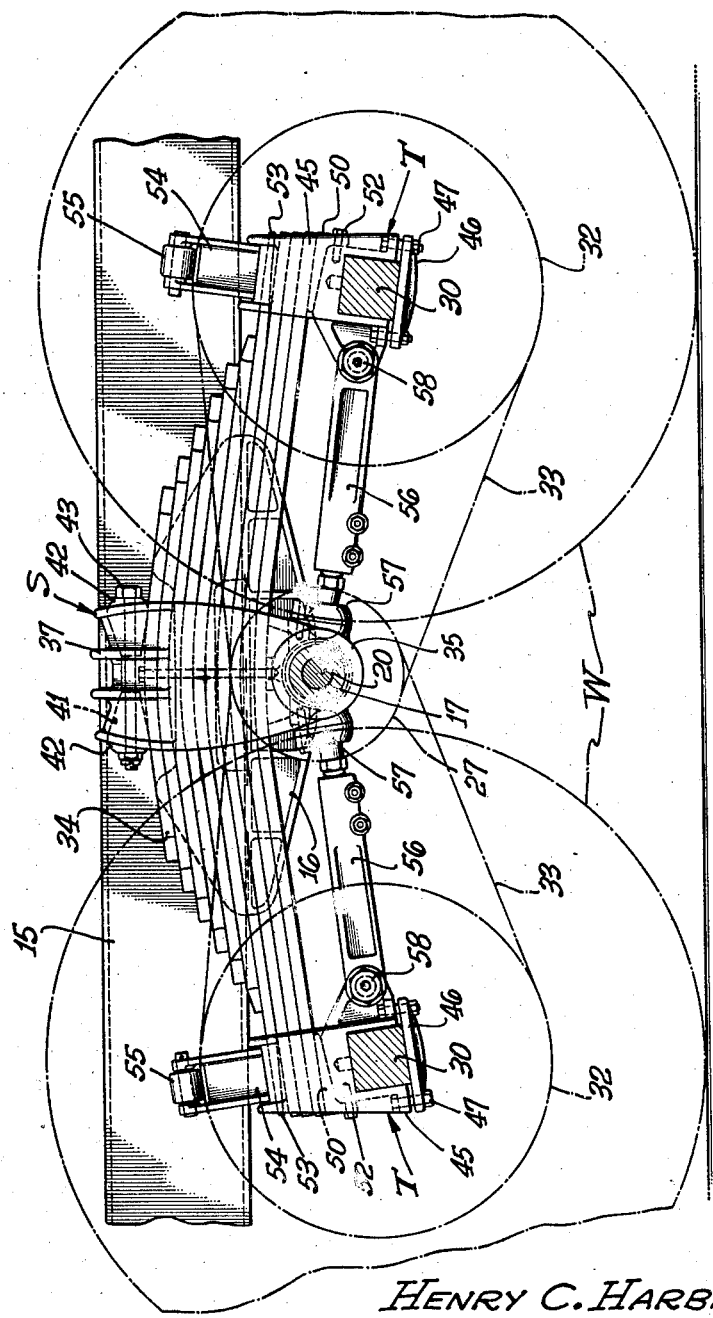
Fig. 2 is a vertical sectional view taken on the line 2—2 of Fig. 1.

The following considerations should be borne in mind in an analysis of the operation of this assembly: Assuming that the vehicle is moving toward the left (Fig. 2) when the brakes are applied they develop a torque in the axles 30 in an anticlockwise direction. The torque developed in the front axle 30 tends to rotate the horizontal pivot pin 58 upward and through an arc whose center is the joint 57. This produces in the front radius rod an axial stress, but because the rod is disposed in line with the axis of the trunnion 17 and the minor axis of the front axle 30, there is no appreciable force generated tending to turn the trunnion. In addition to this, the slight rotation of the axle due to the torque in it, tends to rock the toe of the wedge plate 50 upward, thereby increasing the upward pressure of the toe of the wedge plate against the under side of the bottom leaf of the spring. At the same time it develops downward pressure of the upper and forward part of the stirrup against the upper leaf of the spring at a point opposite the heel of the forward wedge plate. In this way a force couple is developed. This forward downward pressure, of course, is resisted by the resiliency of spring 53, while the upward pressure at the toe is resisted by the bottom leaf of the spring and the load on it. The reactions of the spring urge the axle 30 back toward its normal position. In other words, the spring absorbs the torque force without permitting any substantial rotation of the axle 30 on its own axis. Furthermore, the force couple acting at the toe and heel of the wedge plate may produce slight flexing of the four lower leaves of the spring adjacent to the stirrup.

An action quite similar to this occurs at the rear axle 30. The torque developed here is also in an anticlockwise direction, but it tends to depress the corresponding pivot connection 58. This develops a force couple by reason of the upward pressure of the heel of the rear wedge plate 50 against the bottom leaf of the spring, and the downward pressure at the upper portion of the stirrup opposite the toe, against the top leaf of the spring. Naturally these pressures are resisted by the flexing of the spring near the stirrup.

As both the radius rods' thrust is substantially in a radial line toward the trunnion 17, it is evident that the very slight movements of the pivot pins 58 up and down, incidental to the application of the brakes, do not materially change this direction of thrust. Hence, the application of the brakes does not tend to develop any torque about the trunnion's axis. Consequently, the ends of the springs maintain themselves and the axles 30 at substantially the same level, so that the rear wheels will not rise simultaneously off the roadway to any appreciable degree.

As the couple composed of the two forces acting at the toe and heel of the forward wedge plate is equal and opposite in action to the force couple acting on the rear wedge plate, they balance each other. Their resultant, therefore, develops no force tending to rotate the trunnion and the spring and, hence, "longitudinal" hopping is reduced to a negligible minimum.

Concentration of pressure at the toes and heels of the wedge plates against the bottom leaf of the spring cannot dangerously strain this leaf of the spring because it is backed-up on its upper side by a considerable number of the lower leaves of the spring 34, the lengths of which are substantially equal to that of the bottom leaf. In addition to that, these leaves together form a body that fills the "vertical" height of the guide opening in the stirrup, and this causes the spring to have a relatively snug fit in the stirrup to minimize vertical and horizontal transverse movements but to allow lengthwise spring movements as is necessary to cause the spring to resiliently support the bogie frame.

As the three lower leaves of the spring also fill the inside width of the guide opening through the stirrup, if a wheel on either end of one of the bogie axle tends to rise, it is resisted by the spring at the other end of that bogie axle by an opposing torque force that would be developed about the longitudinal axis of the spring end. In other words, this spring end would resist being twisted and would exert a force tending to hold down the other end of the bogie axle. So each spring end acts as a torsion rod tending to prevent "lateral hopping."

Although I have herein shown and described only one form of motor vehicle embodying my invention, it is to be understood that various changes and modifications may be made herein without departing from the spirit of my invention and the spirit and scope of the appended claims.

I claim:

1. In a four wheel bogie unit: a vehicle frame; a pair of coaxial trunnions transversely on said frame; leaf springs pivoted between their ends on said trunnions; two axles transversely of said frame at opposite sides of said trunnions; radius rods pivotally connected to said axles and to said trunnions beneath said springs to define parallelograms; stirrups secured to the upper sides of said axles in which the ends of said springs are seated; and coacting means on said springs and said stirrups for causing said springs to fit snugly in said stirrups so that the stirrups substantially engage along the upper surface of the spring, and engage along the under surface of the spring, whereby the spring resists brake torque developed in said axles.

2. A four wheel bogie unit as embodied in claim 1, wherein that part of said means on said springs comprises in each instance the end of the top main leaf being bent upwardly to engage the top of the stirrup with pressure.

3. A four wheel bogie unit as embodied in claim 1, wherein that part of said means on said springs comprises in each instance the end of the top main leaf being bent upwardly to engage the top of stirrup with pressure; and wedge members removably fitted in the bottom of said stirrups to facilitate insertion of the springs into the stirrups and upon which the springs seat.

4. In a bogie construction, the combiantion of a driving axle housing; a saddle mounted on said housing; a suspension spring mounted on said saddle; a forward bogie axle, and a rear bogie axle; wheel brakes carried on each of said bogie axles; stirrups rigidly attached respectively to the bogie axles; coacting means on said springs and said stirrups for causing said springs to fit snugly in said stirrups so that the stirrups substantially engage along the upper surface of the spring, and engage along the under surface of the spring, whereby the spring resists brake torque developed in said axles, a forward radius rod disposed substantially on a radial line from the forward bogie axle to the axis of the axle housing; a substantially horizontal pivotal connection between the forward end of the forward radius rod and the forward stirrup, and a flexible connection between its other end and said saddle; a rear radius rod having a flexible connection to the saddle, disposed substantially on a radial line from the axis of the housing to the rear bogie axle, and having a substantially horizontal pivotal connection to the rear stirrup.

5. A bogie construction according to claim 4 including means for mounting the saddle on the driving axle housing enabling the saddle to swing about a substantially horizontal axis so as to enable the front and rear wheels to maintain contact simultaneously with the roadway.

6. In a bogie construction, the combination of a support, a saddle mounted on the same for rocking movement on a substantially horizontal axis, a suspension spring mounted on the saddle and including a plurality of leaves, a bogie axle corresponding to each spring end; a stirrup in the form of a sleeve corresponding to each bogie axle, secured to its bogie axle and having an opening snugly receiving the adjacent end of the suspension spring, so as to extend along and engage the upper and lower sides of the spring; and front and rear radius rods having flexible connections at their ends connecting the same to their corresponding stirrups and to the saddle.

7. A bogie construction according to claim 6 in which the flexible connections between the ends of the radius rods and the stirrups include means for enabling limited rotation of the stirrups to take place about a horizontal axis, said limited rotation operating to develop a force couple in each sleeve resisted by the engagement of the spring against the upper and lower sides of each spring.

8. A bogie construction according to claim 6 in which the openings in the stirrups receive some of the leaves of the springs, said last named leaves being disposed so that they resiliently fill the stirrup openings in a substantially vertical direction.

9. A bogie construction according to claim 6 in which the openings in the stirrups receive several of the leaves of the springs, a portion of said several leaves being disposed so that the uppermost leaf resiliently engages the upper wall of the opening, and with wedge members between the lowermost leaf and the lower wall of the opening.

10. A bogie construction according to claim 6 including a wedge plate seating in said opening movable longitudinally in the sleeve for wedging up the ends of the leaves in the opening to enable the same to substantially fill the "vertical" depth of the spring.

11. A suspension means for four wheeled bogies comprising: a frame; a tubular trunnion disposed transversely to the frame; a leaf spring seated on the trunnion and extending forwardly and rearwardly therefrom; a plurality of the lower leaves of said spring projecting beyond the upper leaves and forming spring ends; a forward axle extending transversely under the forward end of the spring and a rearward axle extending transversely under the rear end of the spring; a stirrup secured to each axle, each having a socket on its upper side fitting over the adjacent spring end with the upper side of the socket engaging the upper side of the spring and the lower side of the socket engaging the underside of the spring, so that the engagement between the socket and spring enables the spring to resist torque forces developed in the axles around their longitudinal axes; and radius rods each having a joint connection at its inner end with the trunnion at one side and having a pivoted joint connection to one of the stirrups at its outer end, said radius rods disposed so that their longitudinal axes are substantially in line with the axis of the trunnion and the axes of said axles; and the lower leaf of said spring at the forward side of the spring extending substantially parallel with the forward radius rod, while the lowest leaf on the rear side of the spring extends substantially parallel with the rear radius rod.

12. A bogie construction according to claim 4 in which the stirrups are in the form of sleeves with openings snugly receiving the ends of the springs, each of said sleeves having an upper face extending along the upper side of the spring and a lower face extending along the under side of the spring, and operating to absorb torque forces developed by the application of the brakes.

HENRY C. HARBERS.